INVENTOR.
LAUREL R. YESKE.

July 7, 1970 L. R. YESKE 3,518,820
HYDRAULIC DRIVE FOR SIDE-DELIVERY RAKE
Filed Aug. 2, 1967 4 Sheets-Sheet 2

INVENTOR.
LAUREL R. YESKE
BY
Geo. J. Muckenthaler ATT'Y

July 7, 1970 L. R. YESKE 3,518,820
HYDRAULIC DRIVE FOR SIDE-DELIVERY RAKE

Filed Aug. 2, 1967 4 Sheets-Sheet 3

INVENTOR.
LAUREL R. YESKE
BY
Geo. J. Muckenthaler ATT'Y

July 7, 1970   L. R. YESKE   3,518,820
HYDRAULIC DRIVE FOR SIDE-DELIVERY RAKE
Filed Aug. 2, 1967   4 Sheets-Sheet 4

INVENTOR.
LAUREL R. YESKE

United States Patent Office 3,518,820
Patented July 7, 1970

---

3,518,820
HYDRAULIC DRIVE FOR SIDE-DELIVERY RAKE
Laurel R. Yeske, Rockford, Ill., assignor to J. I. Case Company, Racine, Wis., a corporation of Wisconsin
Filed Aug. 2, 1967, Ser. No. 657,913
Int. Cl. A01d 77/06
U.S. Cl. 56—377          5 Claims

ABSTRACT OF THE DISCLOSURE

A drive and control system for a side delivery rake including hydraulic fluid drive means for rotating the rake reel. A towing vehicle provides a source of pressurized fluid, and means for carrying the fluid between the source and the drive means, and control means for regulating the flow of the fluid are a part of the system. The pressurized fluid system also includes connections to a hydraulic cylinder for raising and lowering the rake in relation to the ground. A mounting and support structure is provided on the rake frame such that hydraulic or mechanical drive means can be utilized for driving the reel.

BACKGROUND OF THE INVENTION

Side delivery rakes have been used for many years for moving cut material, which has at least partially dried, into windows for further harvesting. There have been various drive means for turning the raking reel such as a power-take-off from a tractor, a belt drive from the power-take-off to one end of the rake reel, or a mechanical drive from the ground wheels. A mechanical drive from one or both of the offset rear mounted ground engaging wheels for the rake reel is shown and described in application Ser. No. 589,727, now Pat. 3,470,683, filed Oct. 26, 1966 and assigned to applicant's assignee. While the mechanical drives have been generally satisfactory, there have been noted defects, such as belt slippage under certain conditions, insufficient ground wheel traction for maintaining a substantially constant speed driving of the rake reel, or the like.

SUMMARY OF THE INVENTION

The present invention relates to an agricultural implement which carries a rotating reel for moving cut material to one side. A side delivery rake will be shown and described as utilizing the invention, although the invention could be applied to other implements. Since a great number of the tractors produced and sold today include a hydraulic system for operating either mounted or towed implements, it is reasonable to assume that this hydraulic system can be expanded to include more functions. Primarily, the hydraulic system has been used for the purpose of raising and lowering the implements in relation to the ground, or for positioning certain parts of implements in relation to other parts or to other implements or to propelling vehicles.

The hydraulic drive and control system of the present invention includes drive means for rotating the rake reel at a desired speed such that there will not be undesirable variations in reel speed. A suitable hydraulic motor is mounted on the rake frame and is connected to one end of the rake reel. Hydraulic lines are connected between the source of pressurized fluid supply on the tractor and the hydraulic motor. The system includes control means for metering the output of the tractor hydraulic pump such that the correct amount of fluid flow is available at the hydraulic drive motor at all times. The rake also includes a hydraulic cylinder for raising and lowering the rake frame and the reel in relation to the ground, and the same hydraulic fluid which drives the raking reel is utilized for accomplishing the raising and lowering function. A flow divider is provided in the hydraulic circuit which divider can be adjusted for proper flow to the hydraulic motor. It is not uncommon to have a large capacity pump on the tractor, wherein this large capacity may be too great for efficiently driving a rake reel, so that the control means is especially important for proper operation of the reel. The hydraulic motor is supported from a special member which is constructed for alternatively carrying a mechanical drive such as a gear box, if a hydraulic system is not available to drive the motor.

The principal object of the present invention is to provide hydraulic drive means for a rake reel.

Another object is to provide a hydraulic drive and control system for a side delivery rake.

An additional object is to provide a control means in the hydraulic circuit for metering the fluid flow to the hydraulic motor.

A further object is to provide a hydraulic system for driving the rake reel and for raising and lowering the rake.

Still a further object is to provide a simple means for reversing the rotation of the rake reel.

And still a further object is to provide indicating means in the hydraulic circuit for detecting abnormal operation.

Another object is to provide a mounting and attaching means for using a mechanical drive or a hydraulic drive for driving the reel.

Additional objects and advantages will become apparent from a reading of the following description taken together with the annexed drawings, in which:

DETAILED DESCRIPTION OF THE PREFERRED EMBODIMENTS

Figure 1:
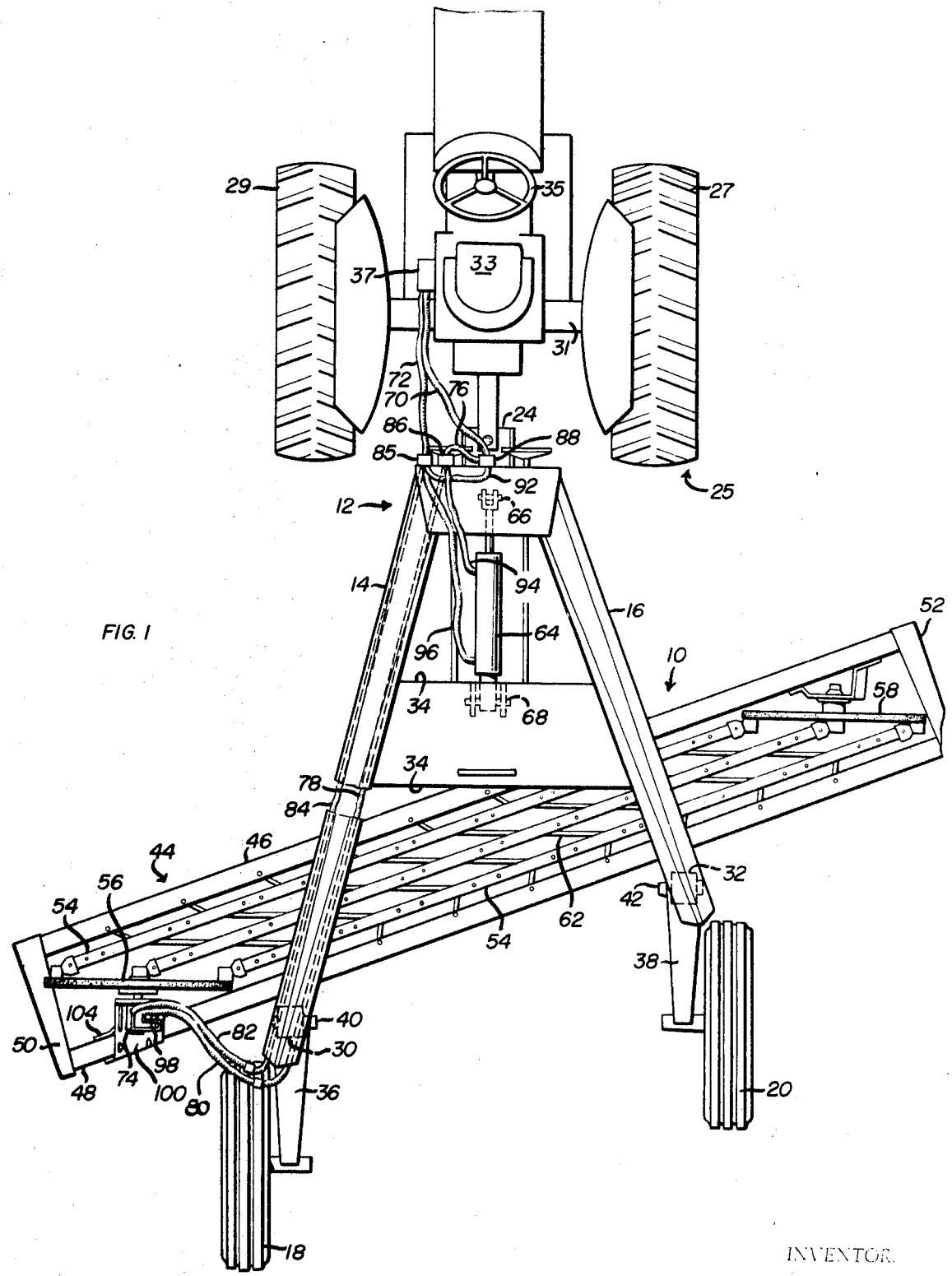
FIG. 1 is a plan view of a side delivery rake embodying one form of the invention.

As seen in the plan view in FIG. 1, there is a side delivery rake generally designated as 10 which includes a main frame 12 having fore and aft extending members 14 and 16 carried on ground engaging wheels 18 and 20. Frame 12 has secured thereto a forward member 22, shown in FIG. 2, extending downwardly and which carries a rake hitch 24 for connecting to a towing vehicle or tractor 25. Tractor 25, of course, includes rear traction wheels 27 and 29 on axle 31, an operator's seat 33 and a steering wheel 35. The tractor need not be further described except that it does have provision for supplying a source of hydraulic fluid under pressure by means of a hydraulic pump and also includes a control valve for regulating or for turning on and off the flow of fluid to the implement. The control valve 37 is shown diagrammatically located for convenience purposes only. The valve with its actuating handle is positioned for ready accessibility to the operator.

Frame 12 has secured near the ends of members 14 and 16, a pair of downwardly extending rear members 30 and 32, shown dotted in FIG. 1. Forward member 22 and rear members 30 and 32 are preferably welded to fore-and-aft members 14 and 16. It is thus seen that members 14, 16, 22, 30 and 32 form a strong, rugged frame structure with a brace 34 connecting members 14 and 16. Rear members 30 and 32 have pivoted thereto wheel arms 36 and 38 rotatably secured by pivots 40 and 42. This feature allows for independent suspension of the supporting wheels 18 and 20 in relation to the main frame 12.

A reel frame or sub-frame, generally designated as 44, is carried by the main frame 12, the sub-frame being disposed in a diagonal direction which, of course, is a requirement in a side delivery rake. As seen in the plan view, the sub-frame is disposed diagonally to the line of travel and the hay or other material is moved from right to left to be placed in a windrow. Sub-frame 44 includes a forward member 46 and a rear member 48 secured together at the ends thereof by side plates 50 and 52. A raking reel or cage includes a plurality of reel bars 54, as shown in FIG. 1 and, in the present embodiment, four in number, which bars are journaled in bearings at the ends thereof to reel plates 56 and 58, the plates form a part of the raking mechanism and are supported from the sub-frame. As the plates 56 and 58 are rotated by the driving mechanism, the reel bars also rotate in the usual and well-known manner.

Figure 4:
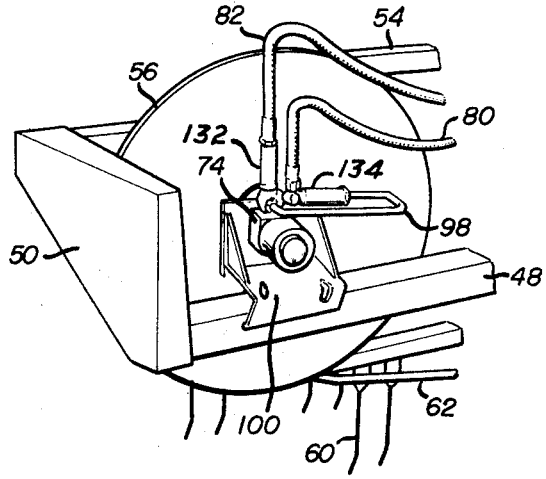
FIG. 4 is a view taken from the left rear of the rake showing the hydraulic motor mounted on the rake frame and connected to the rake reel.

Reel bars 54 are preferably of square tubular construction to which are attached, in suitable manner, the rake teeth 60 shown in FIG. 4. Sub-frame 44 also includes a plurality of stripper bars 62 which are secured at the ends thereof to members 46 and 48.

The reel frame 44 is preferably secured at three points and moves as a unit with the main frame in relation to the ground. The description of the suspension and lift mechanism of the reel frame and the main frame is adequately covered in the above-mentioned application and will only be referred to as it relates to the present invention.

A hydraulic cylinder 64, which is a hydraulic ram assembly, is connected at one end to a yoke 66 on a shaft carried by member 22, and at the other end to a bracket 68 secured to the underside of brace 34. The hydraulic system includes the hydraulic hose lines 70 and 72 connected to the control valve 37 on the tractor. Cylinder 64 and associated structure, as described in the above-mentioned application, are utilized for raising and lowering the rake reel and frames in relation to the ground. The cylinder and connecting structure are such that as the rod and piston are retracted into the cylinder the rake frame is lowered. Extending the piston and rod raises the rake frame.

Figure 2:
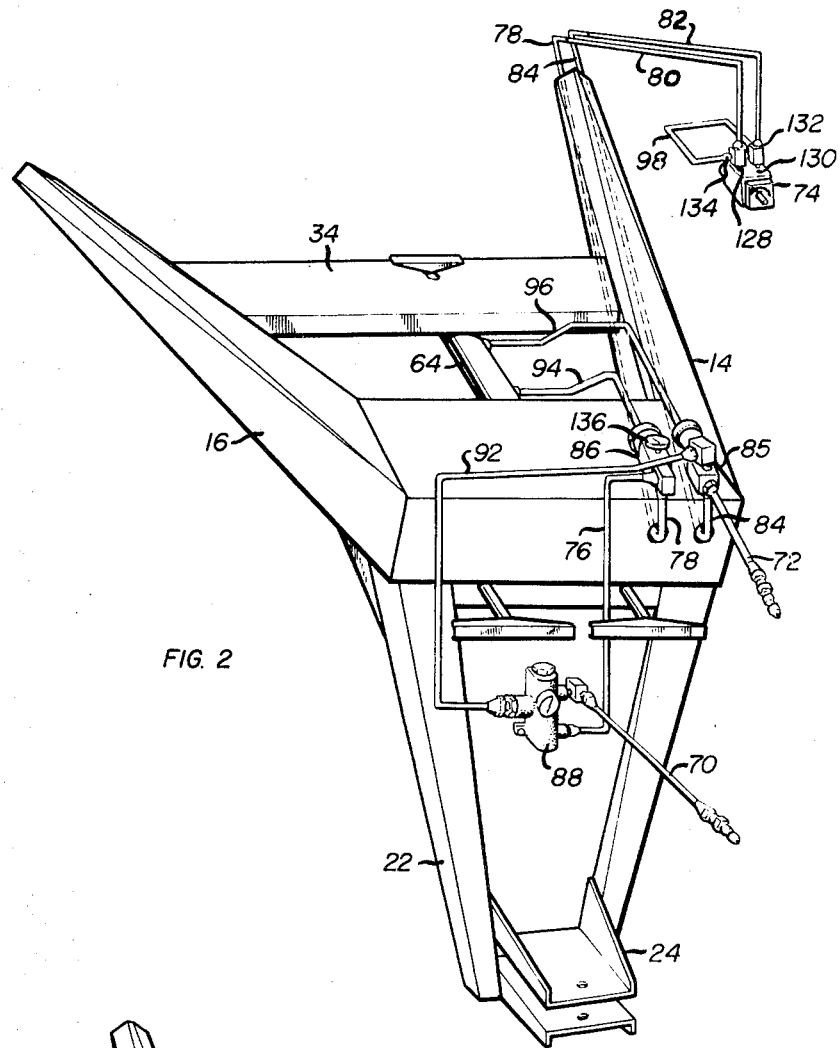
FIG. 2 is a perspective view of part of the rake and showing the hydraulic system.

The hydraulic drive and control system for the rake will now be described. As stated, tractor 25 provides a source of pressurized fluid controlled for on and off flow to the implement by means of valve 37. A hydraulic motor 74 is supported from and mounted on frame member 48 and is connected to reel plate 56 for driving the reel. As seen in FIG. 2, oil or other fluid is pumped or delivered in conduits or hoses 70, 76, 78, and 80 to motor 74 and returned in conduits 82, 84, and 72 to the reservoir and pump on the tractor. The pressurized fluid turns the motor in the desired direction for driving the rake reel for raking hay or other material to one side. Hose fittings 85 and 86 in the nature of a T or an X, as required, as secured to main frame 12 at the front thereof and hose 72 is connected to fitting 85.

In the embodiment shown in FIG. 2, a flow divider 88 is secured to forward member 22 and hose 70 is connected to the divider. The line 76 is connected to divider 88 and to fitting 86 and a line 92 is connected to divider 88 and to fitting 85. A hose 94 connects fitting 86 and the rod end of cylinder 64, and a hose 96 connects fitting 85 and the piston end of cylinder 64. Conduits 78 and 84 are carried within frame member 14 from fittings 86 and 85 to the rear end of the member and conduits 80 and 82 are connected to lines 78 and 84 and to the ports of motor 74. A line 98 is connected to lines 80 and 82 adjacent the motor ports for purposes to be described.

As seen in the various figures, the fluid carrying conduits are generally of the flexible hose type with appropriate fittings and couplings to permit disconnecting of the lines. Conduits 78, 92, 76, 84, and 98 may be of the metallic tubing type to provide for more rigid construction where the flexibility is not desired or required.

Figure 7:
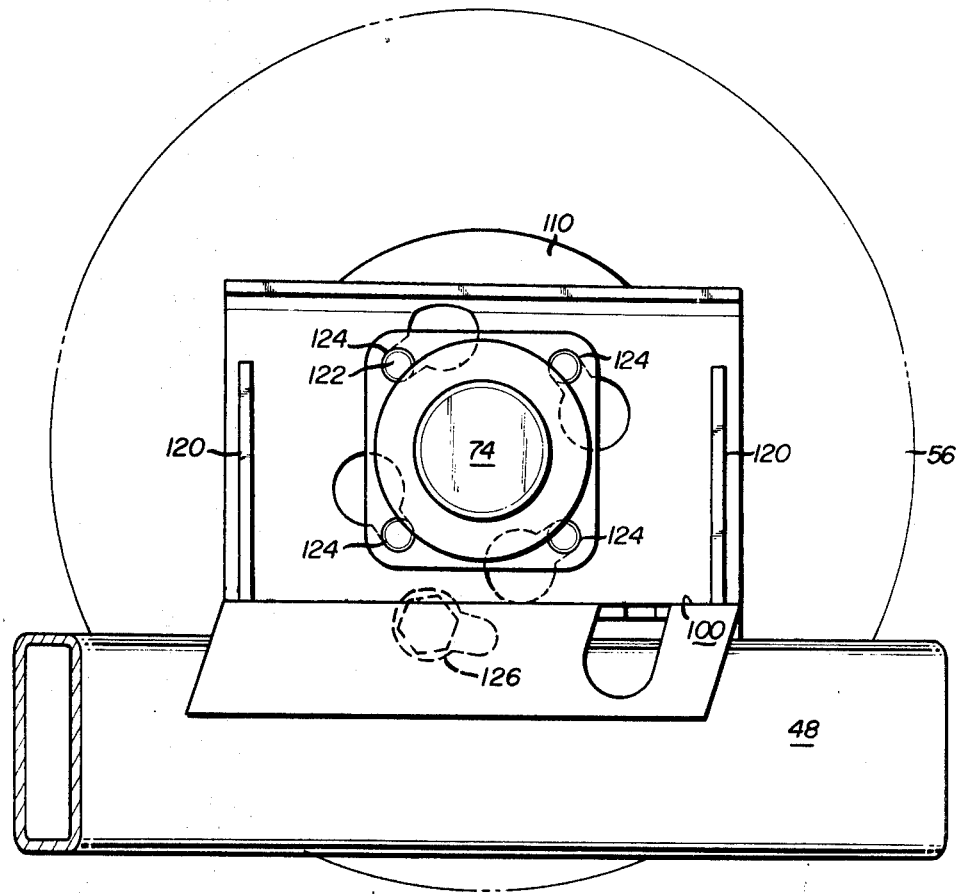
FIG. 7 is a view taken on the line 7—7 of FIG. 6.
Figure 5:
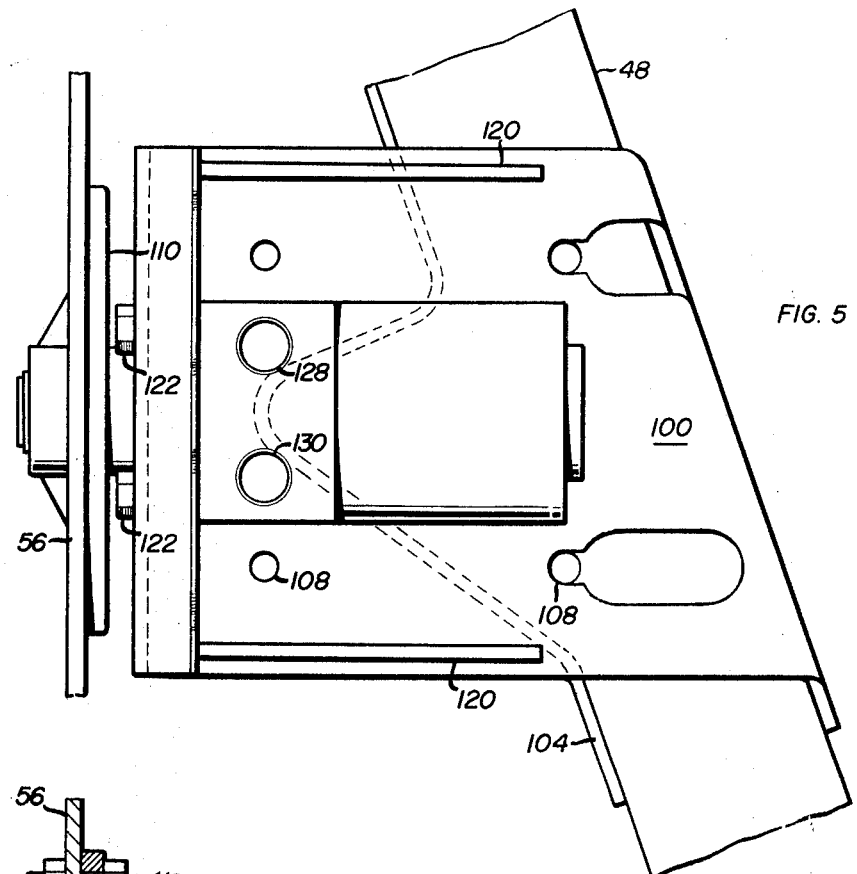
FIG. 5 is a plan view of the mounting for the hydraulic motor.
Figure 6:
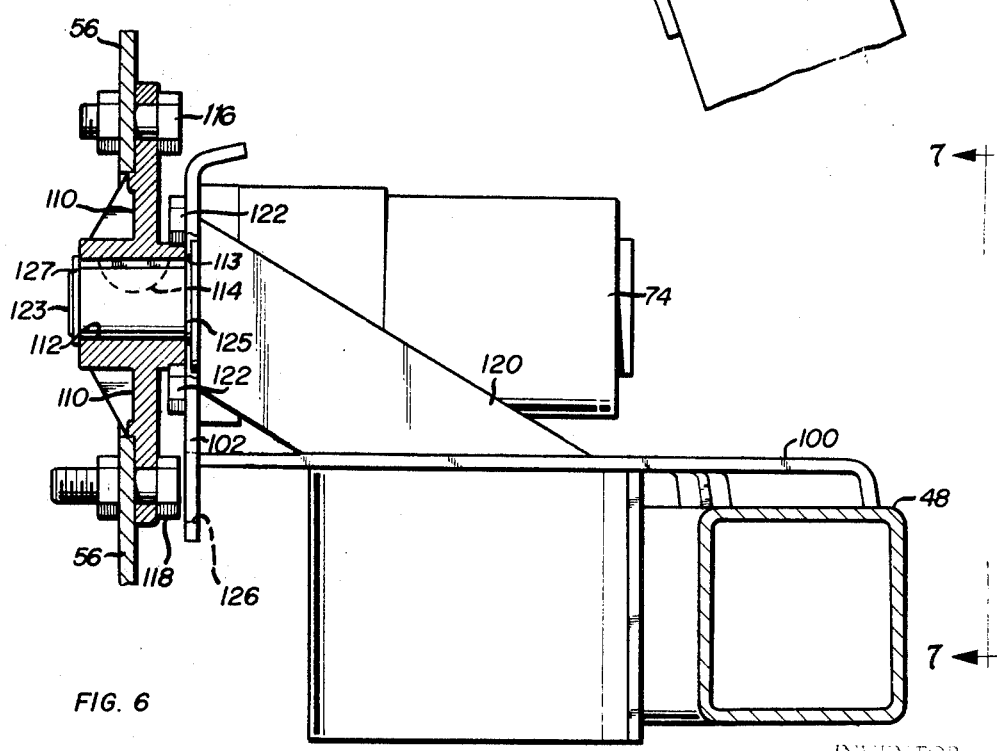
FIG. 6 is a side view partly in section of the same.

The hydraulic motor is mounted on and supported from frame member 48 and the mounting is constructed such that the motor, or a mechanical gear box may be conveniently and easily installed. The mounting means includes a generally horizontal plate member 100 secured to frame 48, and a generally vertical plate member 102. FIGS. 5, 6, and 7 show the construction of the mounting, which affords a feature which is a quick attaching and detaching means. The hydraulic motor is of a type which can be useful for other purposes and when the rake is not in use, the motor can be detached and applied for driving other machines. The same mounting readily accommodates a gear box or the like when it is desired to use a mechanical drive of the type disclosed in the above-mentioned application.

A gusset plate 104 is secured as by welding to the front side of frame member 48 and extends above the member. FIG. 5 shows the gusset extending forwardly for support of plate 100 and the motor. When a mechanical drive including a right angle gearbox is used on the rake the gear box is set on plate 100 and the box is secured by means of studs in openings 108. Plate 100 is slotted for attaching and detaching the studs and the box. As seen in FIGS. 5 and 6 reel plate 56 is secured to a hub 110 having a bore 112. Bore 112 aligns with bore 113 in plate 102. The pinion shaft from the gear box extends into bore 112 and a key 114 secures the shaft and the hub. Bolts 116 secure the reel plate and the hub, there being say three bolts 116 and one bolt 118 being longer than the others. Gussets 120 are disposed on either side of the plate 100 for bracing plates 100 and 102.

When a hydraulic motor is installed on the rake, it is secured to plate 102 by means of studs 122. Shaft 123 of motor 74 is secured to hub 110 by means of key 114 and snap rings 125 and 127. Plate 102 has four equally spaced bolt hole slots 124 for positioning and installing the motor. Another bolt hole slot 126 is disposed on the lower portion for bolt 118. Connections with hydraulic lines 80 and 82 are made to ports 128 and 130. As seen in FIG. 2, line 82 contains a check valve 132 and line 80 contains a check valve 134. The oil flow when the motor is running is through line 80, through the motor and through check valve 132. Valve 134 blocks flow from line 80 to line 98 to line 82 when the motor is running. Valve 134 is free flowing when fluid circulates from the motor port 130 through line 98 and to port 128. This use of the check valves and the by-pass line 98 prevents excessive pressure build-up in the hydraulic circuit when the control valve 37 is closed when the reel is in motion. The kinetic energy of the turning reel circulates the fluid through the line 98 and through the motor until the reel coasts to a stop.

When the hydraulic motor is removed from the rake, the head of bolt 118 is moved into bolt hole slot 126 and then secured such that the reel plate 56 and hub 110 are fixed in place with vertical plate 102. This maintains these parts in position until the motor is again installed.

In the operation of the hydraulic drive and control system, the hydraulic pump on the tractor provides the source of pressurized fluid. The control valve 37 on the tractor is used to control the flow on or off, however, it may be of the type which also regulates the amount of flow. In some hydraulic systems, the pump is so constructed to pump a more or less fixed amount of fluid, say 10 gallons per minute. Other systems may have a pump which is variable so as to pump varying volumes of fluid depending upon the required amounts for certain machines. In the embodiment shown in FIGS. 1 and 2, it is assumed that the pump supplies a fixed amount of fluid at all times through line 70 into the system at a desired ground speed and that the control valve 37 positively opens or closes the flow of fluid to the rake. The flow divider 88 is constructed such that the fluid flow can be regulated and perhaps 6 gallons per minute is the required flow to the hydraulic motor 74. The excess fluid is directed through one side of divider 88, through line 92 and return line 72 to the tractor reservoir. This divider is especially advantageous when it is desired to reduce oil flow from large capacity pumps and when the operator has difficulty in controlling reel speed. Divider 88 can be "dialed" to select the proper oil flow over a wide range of possible flows.

As stated, line 82 includes valve 132 and line 80 includes valve 134 such thta fluid flow is permissive in only one direction when driving the rake reel with the connections as shown. These valves are shown in FIG. 2 wherein fluid is free to flow through conduit 80 to drive the motor in the desired direction as indicated by the arrow. Upon starting the fluid flow to the rake by opening control valve 37 and with the hydraulic cylinder 64 in the circuit, the pressurized flow is through line 70 to divider 88, through lines 76, 78, and 94, with the line 78 providing the reel drive, and with the line 94 going to the rod side of cylinder 64 thereby retracting the cylinder and lowering the rake. Thus there is simultaneous reel drive and rake lowering, and lines 78 and 94 are in a parallel hydraulic circuit relationship, as shown. The pressure on the rod side of the cylinder lowers the reel toward the ground to a predetermined position which position may be accomplished by means of a stop on the cylinder rod or by means of the elevation levers on the front of the rake. Check valve 132 is constructed such that the flow in line 82 is free in the opposite direction from that in line 80 and valve 134 blocks any pressurized flow through line 98 over through valve 132 and line 82 when the motor is being driven.

When it is desired to raise the rake, the flow of pressurized fluid is through lines 72 and 96 and since oil flow to the motor is blocked by valve 132, the increased pressure is diverted to the piston end of cylinder 64 and the rod is extended, thus moving yoke 66 and raising the reel frame and main frame by the cable means shown in FIG. 1 and as described in abovementioned application. As the cylinder is extended, the fluid is forced through lines 94, 76, and 70 to the tractor reservoir.

Another feature of the hydraulic drive is the ease and simplicity of reversing the reel rotation for the purpose of tedding the material. In this operation, the reel rotates backward relative to the direction of travel and the material is fluffed free from the ground for faster drying or curing. The reversing of the reel rotation is done by reversing the fluid lines 82 and 80, and their valves 132 and 134, at the motor ports. Since lines 80 and 82 contain the check valves, the pressurized flow is reversed through the motor and its turns in the opposite direction.

Figure 3:
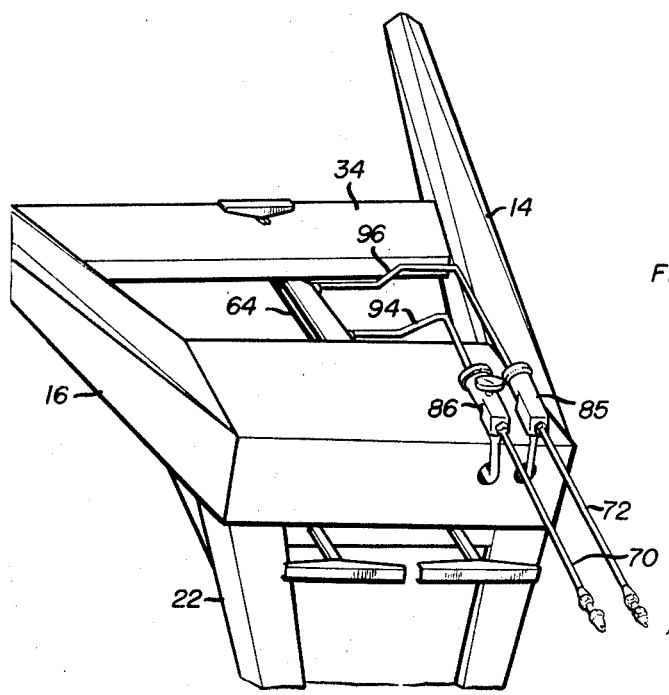
FIG. 3 is a perspective view of part of the rake and showing a different form of the invention.

In FIG. 3 is shown the hydraulic system wherein a hydraulic pump with matching capacity for a hydraulic motor is used and the need for the divider 88 is eliminated. In this construction, conduit 70 is connected directly to fitting 86 and lines 76 and 92 are not required. If an X fitting is installed at 85, the port, in which line 92 was connected as in FIG. 2, is plugged. The description and operation of the drive and control system is the same as described above, when the divider 88 is not utilized.

Another feature and advantage of the hydraulic drive system is the provision of a temperature gage 136 in line 78 to the hydraulic components. Since this line receives normal pressurized flow during operation the gage can be readily observed by the operator and serves as a warning device in case of abnormal operation due to high fluid temperature. The hydraulic system components are thus protected to a certain extent by the use of the temperature gage.

It is thus seen that herein shown and described is a hydraulic drive and control system for a side delivery rake that accomplishes all the objects and advantages as set out above and includes many desirable features. Variations on the above-described embodiments may occur to those skilled in the art, and it is to be understood that all such variations are contemplated as being within the scope of the invention.

What is claimed as new and desired to be secured by Letters Patent of the United States is:

1. In a side delivery rake, a tractor, said rake having a frame, a raking reel rotatably supported on said frame, rotation means on said frame and powered by said tractor for drivingly rotating said reel, ground wheels mounted on said frame, lift means on said frame and operatively connected to said tractor for raising and lowering said frame relative to said wheels, control means on said tractor for operating said rotation means and said lift means at the discretion of the operator, the improvement comprising a hydraulic pump on said tractor, said rotation means being a hydraulic motor, said lift means being a hydraulic ram having two ports relative to respective extending and contracting of said ram for the raising and lowering of said frame, said control means being a hydraulic valve, hydraulic hoses connected between said hydraulic valve and said pump and said hydraulic ram and said hydraulic motor to have said pump power said hydraulic ram and said hydraulic motor, some of said hoses being connected in common between said pump and one of said ports and said hydraulic motor for lowering of said frame and powering of said hydraulic motor for rotating said reel at the time said frame is lowered, and other of said hoses being connected between said pump and the other of said ports for raising said frame.

2. The subject matter of claim 1, wherein said some of said hoses are connected to said hydraulic ram and to said hydraulic motor in a parallel hydraulic circuit connection for applying hydraulic pressure simultaneously to said hydraulic ram and said hydraulic motor.

3. The subject matter of claim 1, including a hydraulic check valve in said other of said hoses extending to said hydraulic motor to preclude reverse rotation of said hydraulic motor when said hydraulic ram is hydraulically pressurized for raising said frame.

4. The subject matter of claim 1, including a check valve in each of said hoses connected to said hydraulic motor for assuring rotation of said reel in only one direction, and a hydraulic by-pass line connected to said hoses connected to said hydraulic motor for relieving hydraulic pressure in said hydraulic motor when said hydraulic valve is closed, to render said reel freely rotatable.

5. A supporting assembly for carrying hydraulic drive means for a side delivery rake having a frame, a raking reel carried on the frame and reel plates drivingly supporting the reel, said supporting assembly including a generall horizontal portion connected to said frame, a generally vertical portion extending from said horizontal portion and positioned with one side of said vertical portion next to and adjacent one of said reel plates, said vertical portion having a centrally located aperture therein and having key hole slots spaced around said aperture, and bolt means and an extending shaft on said hydraulic drive means and with said bolt means and said shaft respectively extending into said key hole slots and said aperture for mounting said hydraulic drive means on the other side of said vertical portion such that said hydraulic drive means connects to and drives said one of said reel plates.

References Cited

UNITED STATES PATENTS

| | | | |
|---|---|---|---|
| 2,525,719 | 10/1950 | Phillips | 172—451 |
| 2,649,681 | 8/1953 | Hill | 56—377 |
| 2,833,107 | 5/1958 | Sutherland et al. | 56—377 |
| 3,181,619 | 5/1965 | Smith et al. | 172—451 X |

FOREIGN PATENTS

| | | |
|---|---|---|
| 510,518 | 10/1953 | Belgium. |
| 1,434,370 | 2/1966 | France. |

RUSSELL R. KINSEY, Primary Examiner